March 13, 1951   W. SEIGLE   2,544,968
FISHING FLOAT

Filed Feb. 7, 1949   2 Sheets-Sheet 1

William Seigle
INVENTOR,

BY Bernard P. Miller
ATTORNEY

March 13, 1951     W. SEIGLE     2,544,968
FISHING FLOAT
Filed Feb. 7, 1949     2 Sheets-Sheet 2
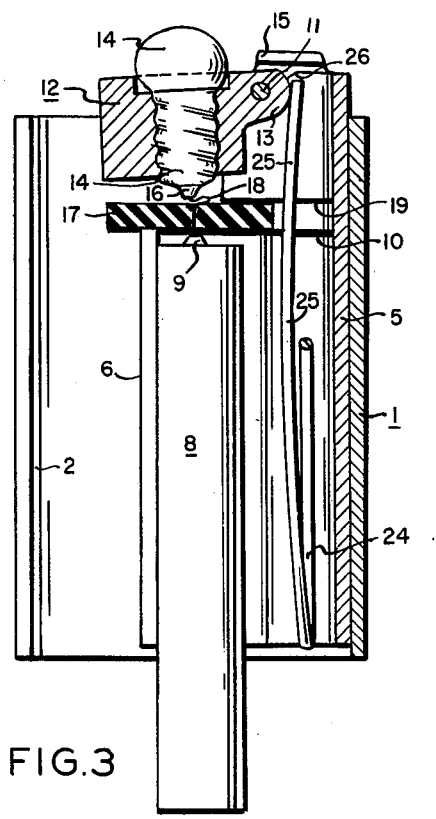
FIG. 3
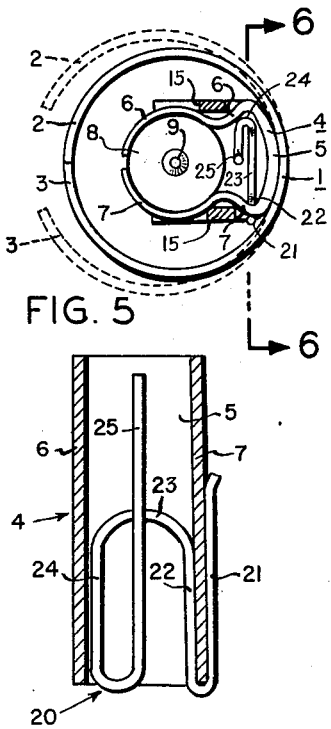
FIG. 5
FIG. 6
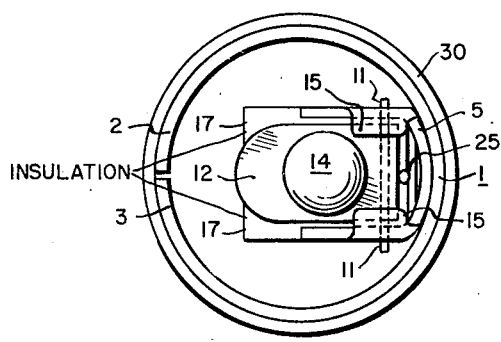
FIG. 4
William Seigle
INVENTOR,
BY
Bernard P. Miller
ATTORNEY Patented Mar. 13, 1951

2,544,968

UNITED STATES PATENT OFFICE 2,544,968

FISHING FLOAT

William Seigle, Dallas, Tex.

Application February 7, 1949, Serial No. 74,927

7 Claims. (Cl. 43—17.5)

The present invention relates to floats for fishing lines, and more particularly to fishing line floats for night fishing.

The principal object of the invention, is to provide a float which will automatically become illuminated when discomposed by a fish bite on the line to which the float is attached.

The float of the present invention is particularly designed for use on casting lines, and therefore, an important object of the invention is to provide a self-illuminating float weight to be practical as a casting line float.

The float of the present invention is an improvement over the float covered by a United States patent numbered 2,329,790, which was issued to me on September 21, 1943. The float of the patent, and the present float, both carry a light bulb and an electric battery.

In use, it has been found that the light bulb of the patent is prone to flicker as the line is being reeled in. Therefore, an object of the present invention is to provide a light bulb carrying mechanism, which holds the bulb in steady contact with the battery, once the float is disposed at an angle to make the contact, and in which normal bobbing and jiggling in the water will fail to make the light flicker.

A further object is to provide a float of this class which is so designed that battery and bulb replacement is a simple operation.

Other objects will be apparent from the following description when taken in conjunction with the accompanying two sheets of drawings, wherein:

Figure 3 is an enlarged vertical sectional view detailing the battery holder and its associated elements;

Figure 4 is a top view of the mechanism shown in Fig. 3;

Figure 5 is a plan view looking at the top of the battery holder, per se; and,

Figure 6 is a vertical sectional view taken substantially along the line 6—6 of Fig. 5.

Like characters of reference designate like parts in those figures of the drawings in which they occur.

In the drawings:

Figure 1:
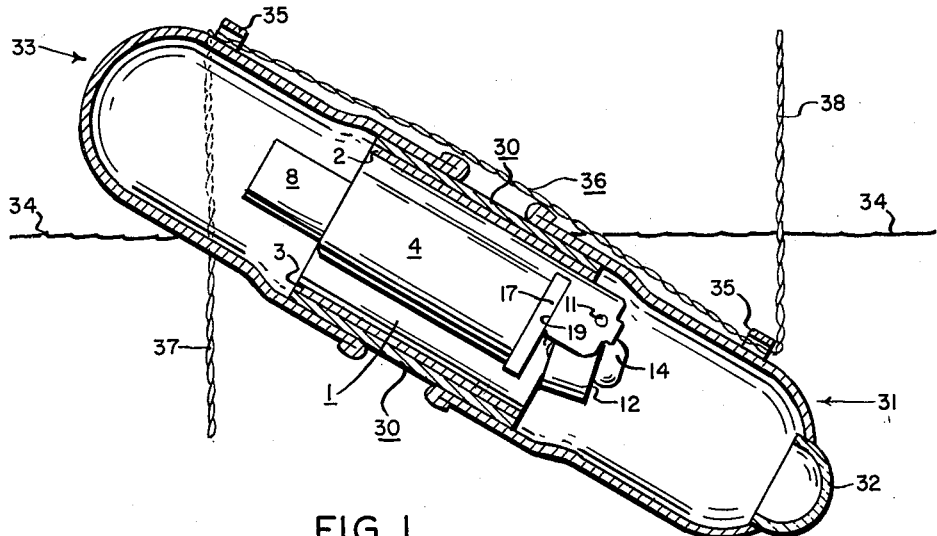
Figure 1 is a vertical sectional view showing the device in the position it normally assumes when floating in water, the section being taken along the longitudinal axis thereof.

The reference numeral 1 indicates, as a whole, a battery holder which is made in the form of a tubate sleeve, the wall of which has been split longitudinally to provide oppositely disposed sides 2 and 3. The holder 1 is made of resilient metal, so that the sides 2 and 3 have the inherent tendency to assume the distended positions shown in dotted lines in Fig. 5.

The holder 1 further includes a spring battery clamp 4 which is firmly mounted within the holder sleeve. The clamp 4 has an elongated stationary portion 5 which is arcuate in cross-section, and which is welded or brazed flatly to the inside surface of the holder sleeve. The clamp 4 further includes a pair of elongated spring arms or wings 6 and 7 which are formed arcuately to resiliently embrace the major peripheral portion of a conventional dry-cell electric battery 8. The reference numeral 9 indicates the central pole or upper end contact terminal of the battery.

The sleeve of the holder 1 extends some distance above the upper end 10 of the clamp 4, and adjacent its upper end, the sleeve is bridged by a transverse pivot pin 11. A lamp or bulb carrier 12 has a laterally projecting boss 13 which is pivotally mounted on the pivot pin 11. The carrier is made of metal, and is centrally bored and threaded to receive a conventional flash light bulb 14. The carrier 12 is so mounted that it may gravitationally swing the bulb 14 toward and away from the contact end 9 of the battery 8, according to the position at which the holder 1 is disposed. In other words, when the bulb 14 is uppermost, the carrier 12 will gravitate to swing the bulb toward the battery, but when the holder is so disposed that the battery contact end is above the pivot pin 11, the carrier will gravitationally swing the bulb away from the battery. The upper end of the holder sleeve is provided with one or more inturned flanges 15 which act as a stop for the carrier 12, when the carrier is swung away from the battery.

Figure 2:
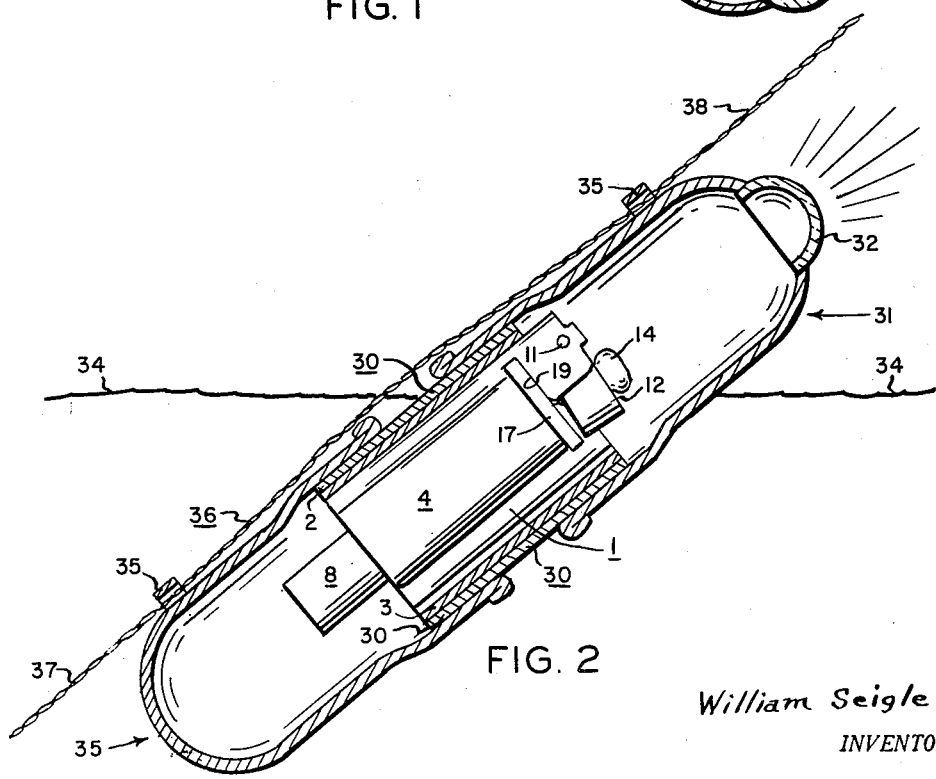
Figure 2 is a similar view showing the float in the position it may assume after being tilted by a fish bite on the line.

As a buffer or shock absorber to prevent the blow of the falling carrier 12 from injuring the contact terminal 9 of the battery or the contact terminal 16 of the bulb 14, and to also act as an electrical conductor between the two terminals, there is provided a block 17 of insulating material having a spring wire 18 passing therethrough. The block is pressed into the holder sleeve upon the upper end 10 of the clamp 4, and beneath a downwardly facing shoulder 19 formed in the sleeve (Figs. 1 and 2). The wire 18 has its lower end in constant contact with the battery terminal 9, and its upper end projects slightly above the block 17, and is bent to form a partial convolution of a helix. This upper end of the wire 18 is positioned in the path of the terminal 16 of the bulb 14.

It is obvious that jostling or jiggling the holder 1 and its supported elements might well rock or teeter the carrier 12 on the pivot pin 11, even though the pin is above the battery. This of course would result in the bulb flashing on and off. In order to stabilize the carrier 12 to hold it against such jiggling action, a bent spring wire clip 20 is provided inside the holder 1.

The clip 20 has a fold formed by two parallel sides 21 and 22 (Fig. 6), which is adapted to be forced upwardly to frictionally impinge the arm 7 of the clamp 4. The clip further has a central bend 23 and a vertical side 24 which is adapted to be simultaneously forced upwardly inside the clamp 4 between the arms 6 and 7 so that the side 24 is frictionally pressed outwardly against the inside surface of the arm 6. The clip 20 further includes a central upwardly extending post or rod portion 25 the upper end of which presses resiliently against the outer rounded edge 26 of the carrier boss 13. The boss edge 26 rocks against the rod 25 when the carrier 12 rocks on its pivot pin 11, and the free and unrestricted movement of the carrier is thereby dampened sufficiently to prevent jiggling.

The float of the present invention further includes a hollow sectional housing to enclose the above described battery holder and its associated elements. This housing includes a central section 30 which is open ended and tubular, and into which the holder 1 may be snugly inserted when its sleeve sides 2 and 3 are pressed together.

The housing further includes a substantially dome-shaped cap 31 adapted to fit with a water and air tight seal over the end of the section 30 lying nearest the light bulb 14. The cap 31 is made of some suitable opaque material, preferably some plastic composition, and its rounded outer end is provided with a transparent semispherical window 32.

The housing further includes another dome-shaped cap 33 adapted to fit over the other end of the middle housing section 30 with an air tight seal therewith.

The weight of the mechanism in the housing is so distributed, that the device will float in water at substantially the position shown in Fig. 1. In this figure and in Fig. 2, the upper surface of the water is depicted as being the wavy line 34.

When the device is in the position shown in Fig. 1, the pivot pin 11 lies below the contact end of the battery, and therefore the bulb carrier has therefore gravitated away from the block 17. Consequently, there is no travel of electrical current to the bulb. The two caps 31 and 33 are exteriorly provided with line engaging loops or eyes 35 through which a fishing line 36 may be passed, or to which the line may be tied.

In Fig. 1, the left hand vertical portion of the line 36 is the portion that leads to the fish hook and bait, while the right hand vertical portion leads to the fishing pole or casting rod, not shown. These line portions are respectively indicated by the reference numerals 37 and 38.

When a fish bites the hook on the end of the line portion 37, the entire device is tilted from the position of Fig. 1 to a position somewhat similar to that of Fig. 2. At least, the fish if snagged on the hook, will tilt the device until the battery is below the pivot pin 11. When this occurs, the holder 12 will gravitate toward the block 17 and the contact terminal 16 of the bulb will be swung into contact with the electrical circuit from the battery to the filament in the bulb. The light bulb will therefore be illuminated and will be visible from a distance through the transparent window 32.

The battery 8 may be easily and quickly replaced by removing the cap 33 from the body section 30, and the bulb 14 may be replaced by similarly removing the cap 31.

Obviously the invention is susceptible to some change or alteration without defeating its practicability, and I therefore do not wish to be confined to the preferred embodiment shown in the drawings and described herein, further that I am limited by the scope of the appended claims.

I claim:

1. An illuminating fishing float, comprising: a hollow air-tight body; an electric battery firmly anchored within said body; a bulb carrier pivotally mounted adjacent the contact end of the battery; an electric light bulb supported by the carrier in a position to be swung into and out of circuit making contact with the battery; and frictional means for stabilizing the carrier to prevent teetering, so long as the bulb is in circuit making contact with the battery.

2. Structure as specified in claim 1, and means for cushioning the blow of the carrier as it moves the bulb into circuit making contact position.

3. An illuminating fishing float, comprising: a battery; a holder for the battery in the form of a longitudinally split sleeve; a longitudinal extension of the sleeve projecting beyond the electrical contact end of the battery; a bulb carrier pivotally supported by the extension to gravitationally move toward and away from the battery; an electric light bulb operatively supported by the carrier with its contact end presented toward the battery; a tubate housing section around the sleeve; a removable cap adapted to engage the housing section in a water tight manner, and to house the carrier and the bulb; and a second cap adapted to similarly engage the other end of the housing section, and adapted to form an air chamber normally maintaining the device afloat in water.

4. Structure as specified in claim 3, and means for stabilizing the bulb carrier to prevent teetering, so long as the bulb is in circuit making contact with the battery.

5. Structure as specified in claim 4, and means for cushioning the blow of the bulb carrier as it moves the bulb into circuit making contact position.

6. Structure as specified in claim 3, and means for cushioning the blow of the bulb carrier as it moves the bulb into circuit making contact position.

7. An illuminating fishing float, comprising: a hollow air-tight body; an electric battery firmly anchored within said body; a bulb carrier pivotally mounted adjacent the electrical contact end of the battery; an electric light bulb supported by the carrier in a position to be swung into and out of circuit making contact with the battery; and cushioning means between the bulb and the battery.

WILLIAM SEIGLE.

REFERENCES CITED

The following references are of record in the file of this patent:

UNITED STATES PATENTS

| Number | Name | Date |
|---|---|---|
| 1,438,179 | Hollander | Dec. 12, 1922 |
| 2,201,588 | Kuhns | May 21, 1940 |
| 2,329,790 | Seigle | Sept. 21, 1943 |